United States Patent
Hamlin et al.

(10) Patent No.: US 12,112,086 B2
(45) Date of Patent: Oct. 8, 2024

(54) DYNAMICALLY CONFIGURING EXTERNAL DISPLAY DEVICES

(71) Applicant: Dell Products L.P., Round Rock, TX (US)

(72) Inventors: Daniel L. Hamlin, Round Rock, TX (US); Malathi R, Madurai (IN); Gokul Thiruchengode Vajravel, Bangalore (IN); Parminder Singh Sethi, Punjab (IN)

(73) Assignee: Dell Products L.P., Round Rock, TX (US)

( * ) Notice: Subject to any disclaimer, the term of this patent is extended or adjusted under 35 U.S.C. 154(b) by 306 days.

(21) Appl. No.: 17/734,628

(22) Filed: May 2, 2022

(65) Prior Publication Data

US 2023/0350622 A1    Nov. 2, 2023

(51) Int. Cl.
*G06F 3/14*     (2006.01)
*G06T 3/40*     (2006.01)

(52) U.S. Cl.
CPC . *G06F 3/14* (2013.01); *G06T 3/40* (2013.01)

(58) Field of Classification Search
None
See application file for complete search history.

(56) References Cited

U.S. PATENT DOCUMENTS

| | | | | |
|---|---|---|---|---|
| 2009/0309886 A1* | 12/2009 | Sneed | ....................... | G06F 3/14 345/520 |
| 2013/0162502 A1* | 6/2013 | Lee | .................... | H04N 21/4424 345/1.2 |
| 2013/0222434 A1* | 8/2013 | Park | ......................... | G06T 3/40 345/668 |
| 2013/0222698 A1* | 8/2013 | Sharma | ..................... | G06T 1/60 348/E7.052 |
| 2013/0328878 A1* | 12/2013 | Stahl | ...................... | G09G 5/005 345/1.3 |
| 2018/0046428 A1* | 2/2018 | Breedvelt-Schouten | .................... | G06F 3/1423 |
| 2018/0285049 A1* | 10/2018 | Lim | ...................... | G06F 3/1446 |

* cited by examiner

*Primary Examiner* — Hilina K Demeter
(74) *Attorney, Agent, or Firm* — Kirton McConkie; Brian Tucker (57) ABSTRACT

External display devices can be dynamically configured. An adaptive display engine may be configured to receive requests from agents executing an users' client computing devices when the users connect their client computing devices to external display devices. Such a request may indicate that one or more external display devices have been connected to a client computing device and may identify the display configuration for the one or more external display devices and an internal display device. The adaptive display engine can dynamically determine recommended settings based on the specified display configuration and return the recommended settings to the agent. The agent can then automatically apply the recommended settings on the client computing device.

20 Claims, 10 Drawing Sheets

Settings Prediction Table 200

| Device Info | Internal Resolution > External Resolution | Internal Scale Ratio > External Scale Ratio | External Screen Size > Internal Screen Size | Settings for External Display Device |
|---|---|---|---|---|
| • Client Computing Device ID<br>• OS Info<br>• Video Driver Info<br>• Video Controller Info<br>• VGA Capabilities<br>• ⋮ | No | No | Yes | • No change to resolution of external display device<br>• Set scale ratio of external display device to 25% more than scale ratio of internal display device |
| | No | Yes | Yes | • No change to resolution of external display device<br>• Set scale ratio of external display device to 25% less than scale ratio of internal display device |
| | Yes | Yes | Yes | • Apply previously stored settings |
| | ⋮ | | | |

DYNAMICALLY CONFIGURING EXTERNAL DISPLAY DEVICES

CROSS-REFERENCE TO RELATED APPLICATIONS

N/A

BACKGROUND

External display devices are increasingly being used. For example, many employers provide laptops to their employees to facilitate working from home or other locations. Users may oftentimes connect their laptops (or similar personal computing device) to different types and numbers of external display devices. For example, a user may have a work setup that includes multiple external monitors on which the desktop is extended and a home setup that includes a single large television on which the desktop is mirrored. In a similar example, administrators in a datacenter may use a common external display device to connect to multiple servers.

A scale ratio is used by the operating system to define the size of windows, text, icons, etc. when they are displayed on a particular display device. The operating system may consider the resolution and size of the display device when selecting a scale ratio. For example, the scale ratio of a laptop's internal display device may be set to 150% by default so that the windows, text, icons, etc. are not too small. When external display devices are connected, operating systems, such as Windows, may set the scale ratio of each external display device in a similar default manner. For example, Windows may set the scale ratio of a large external display device to 300% by default.

This default functionality that the operating system provides is oftentimes undesirable or inadequate. For example, by setting the scale ratio of a large display device to 300% by default, it may cause the windows, text, icons, etc. to be too large on the external display device for the user's liking thus reducing the benefits of having a large display device (e.g., the text size is too large to effectively have multiple windows displayed simultaneously on the single external display device). In other scenarios, the operating system could cause the windows, text, icons, etc. to be too small for the user's liking.

In such cases, if the users are unsatisfied with the default scale ratios set by the operating system, they must manually adjust them. Yet, these manual adjustments are beyond the skill level of many users. In any case, it is a tedious process particularly when the user may connect to a variety of external display devices.

BRIEF SUMMARY

The present invention extends to systems, methods and computer program products for dynamically configuring external display devices. An adaptive display engine may be configured to receive requests from agents executing an users' client computing devices when the users connect their client computing devices to external display devices. Such a request may indicate that one or more external display devices have been connected to a client computing device and may identify the display configuration for the one or more external display devices and an internal display device. The adaptive display engine can dynamically determine recommended settings based on the specified display configuration and return the recommended settings to the agent. The agent can then automatically apply the recommended settings on the client computing device.

In some embodiments, the present invention may be implemented as a method for configuring an external display device. An adaptive display engine can receive a request for recommended settings for an external display device that has been connected to a client computing device. The request can identify a display configuration. The adaptive display engine can analyze the display configuration to dynamically determine the recommended settings for the external display device. The adaptive display engine can provide the recommend settings to the client computing device to thereby enable the client computing device to automatically apply the recommended settings to configure the external display device.

In some embodiments, the present invention may be implemented as computer storage media storing computer executable instructions which when executed by one or more processors implement a method for configuring an external display device. An agent executing on a client computing device may detect that an external display has been connected to the client computing device. The agent may obtain display configuration in response to detecting that the external display device has been connected to the client computing device. The agent may send a request for recommended settings for the external display device to an adaptive display engine. The request can include the display configuration. The agent can receive the recommended settings for the external display device from the adaptive display engine after the adaptive display engine has dynamically determined the recommended settings based on the display configuration. The agent can then apply the recommended settings to configure the external display device.

In some embodiments, the present invention may be implemented as a system that includes an adaptive display engine and a plurality of client computing devices that each include an agent. The adaptive display engine and each agent may be configured to implement a method for dynamically configuring external display devices that are connected to the plurality of client computing devices. The agent can detect that an external display has been connected to the respective client computing device. The agent can obtain a display configuration in response to detecting that the external display device has been connected to the respective client computing device. The agent can send to the adaptive display engine a request for recommended settings for the external display device. The request can include the display configuration. The adaptive display engine can generate the recommend settings for the external display device based on the display configuration. The agent can receive from the adaptive display engine the recommended settings for the external display device. The agent can apply the recommended settings to configure the external display device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
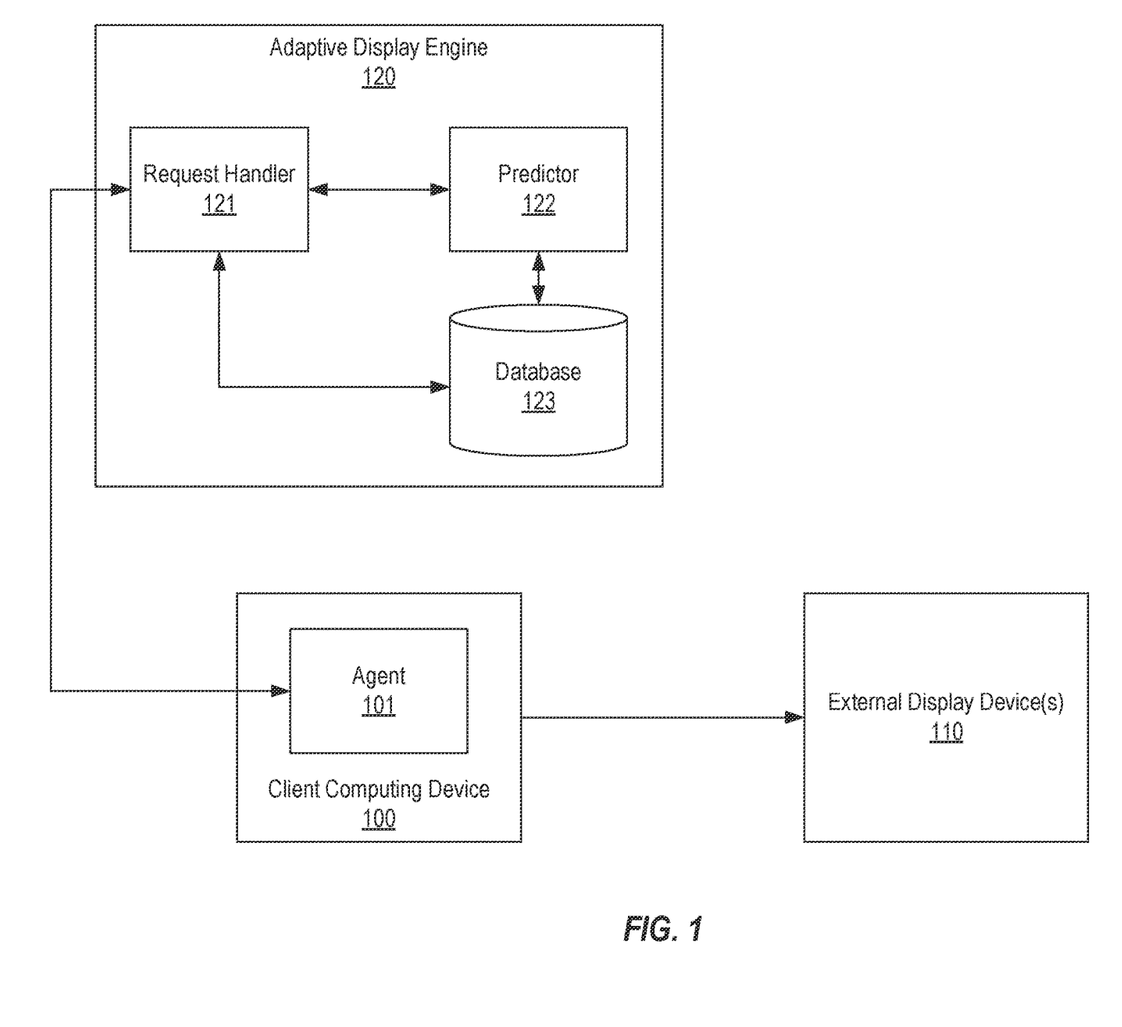
FIG. 1 provides an example of a computing environment in which embodiments of the present invention may be implemented.

FIG. 1 illustrates a computing environment in which embodiments of the present invention may be implemented. As shown, a client computing device 100, which may typically be a laptop but could be another similar computing device, is connected to one or more external display devices 110. External display devices 110 can encompass monitors, televisions, smart phones, tablets, or any other type of display device on which client computing device 100 may output at least a portion of a desktop. In some embodiments, a user may connect client computing device 100 to multiple sets of one or more external display devices 110. For example, the user could connect client computing device 100 to a set of external display devices at home and one or more different sets of external display devices at work.

Figure 1A:
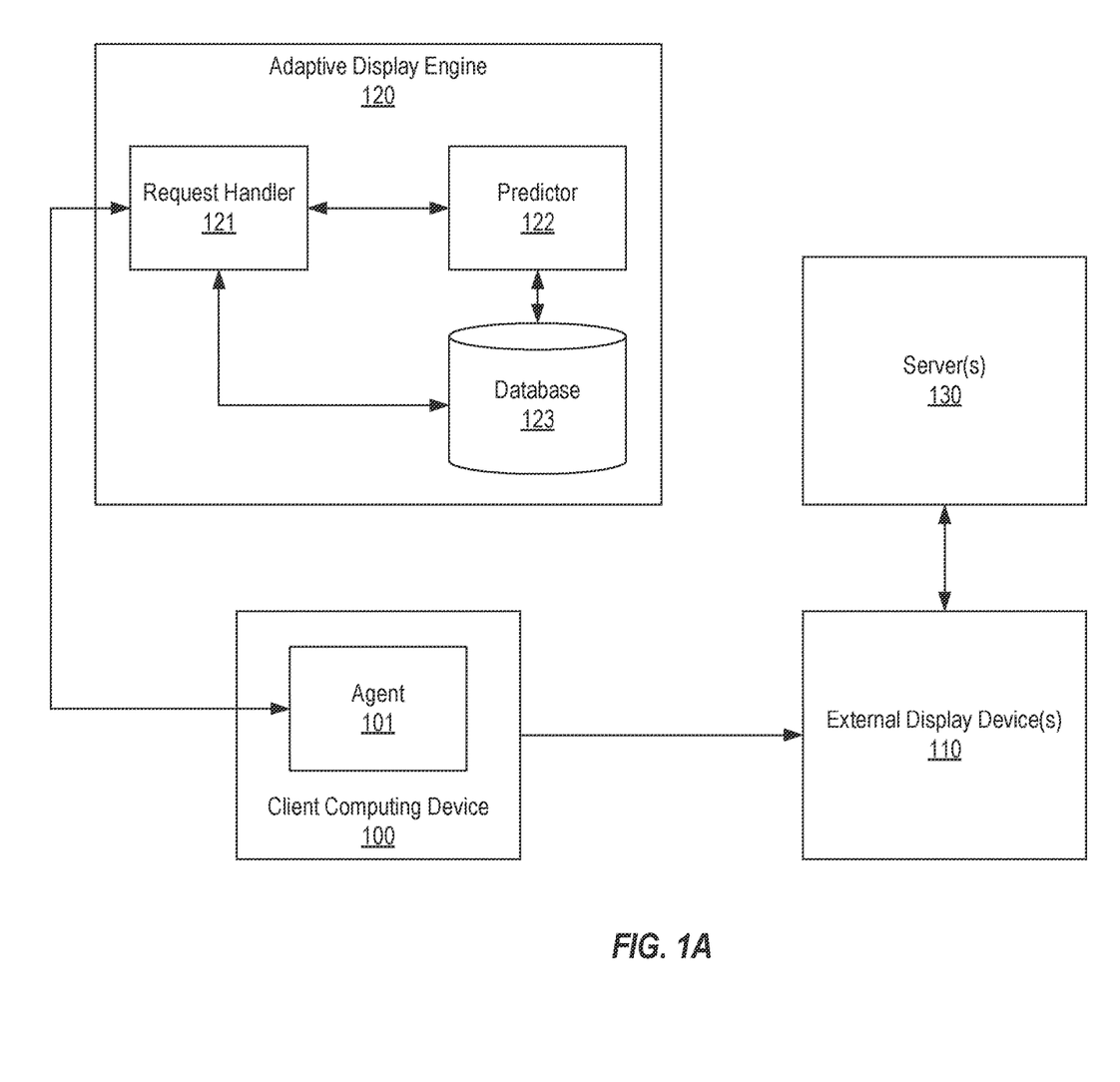
FIG. 1A provides another example of a computing environment in which embodiments of the present invention may be implemented.

FIG. 1A illustrates a slightly different computing environment in which embodiments of the present invention may be implemented. In comparison to FIG. 1, in FIG. 1A, the user may be an administrator that uses client computing device 100 to connect to server(s) 130 for purposes of displaying desktops or windows of server(s) 130 on external display device(s) 110. In other words, when embodiments of the present invention are implemented in the environment represented in FIG. 1A, the desktop or windows for display on external display device(s) 110 may originate at server(s) 130 but client computing device 100 retains the ability to control the configuration of external display device(s) 110 when displaying such content (e.g., by accessing the servers via a remote display protocol).

In both FIG. 1 and FIG. 1A, the computing environment also includes an adaptive display engine 120. In some embodiments, adaptive display engine 120 may be hosted in the cloud or other network accessible location such that many client computing devices 100 may access adaptive display engine 120 wherever they may be located. Adaptive display engine 120 can include a request handler 121, a predictor 122 and a database 123. An agent 101 may be deployed on client computing device 100 and may be configured to interface with request handler 121 as described below.

As an overview, agent 101 can be configured to interface with various components on client computing device 100 to detect when client computing device 100 is connected to one or more external display devices 110 and to automatically apply settings to external display devices 110 that are dynamically determined by adaptive display engine 120 based on a display configuration. To accomplish this, adaptive display engine 120 may include a request handler 121, a predictor 122, and a database 123.

In some embodiments, request handler 121 may represent an endpoint (e.g., a REST API) by which agent 101 can communicate with adaptive display engine 120. Predictor 122 may represent one or more components that are configured to predict settings for each external display 110 to which client computing device 100 may be connected. Predictor 122 may rely on display configurations maintained in database 123 to make such predictions. These display configurations may be provided by agent 101 and may include, among other things, some or all of the resolution, scale ratio, refresh rate, and screen size of an internal display device of client computing device 100 and of each external display device 110 to which client computing device 100 may be currently connected. In some embodiments, predictor 122 may implement a machine learning algorithm to predict settings based on a display configuration.

Figure 2:
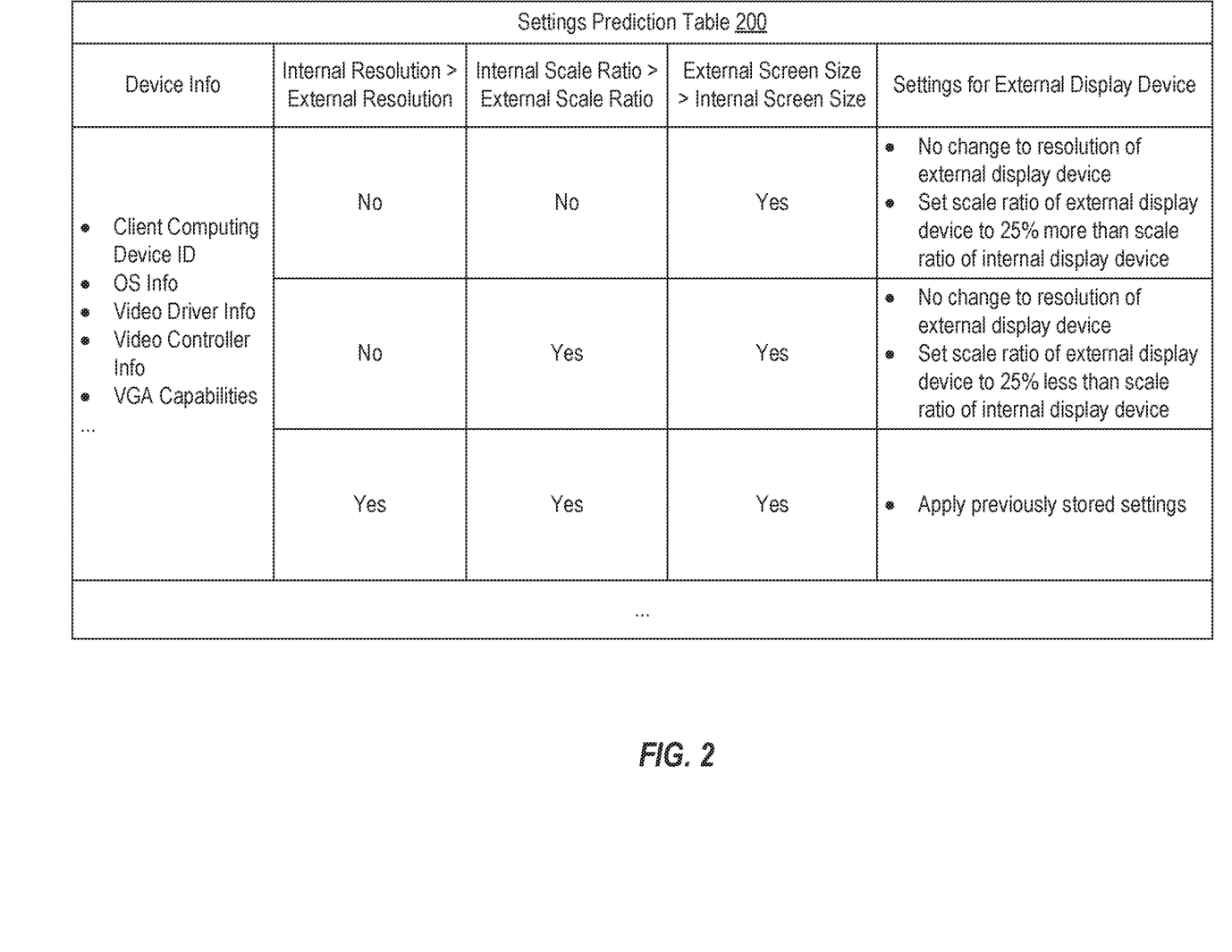
FIG. 2 provides an example of a settings prediction table that could be used to predict settings for an external display device in accordance with embodiments of the present invention.

FIG. 2 provides a simple example of a settings prediction table 200 that could be maintained in database 123 and used by predictor 122 to predict settings for a particular display configuration. Settings prediction table 200 may associate a variety of device information with multiple display configurations and may define recommended settings for each display configuration. This device information can include information about client computing device 100 such as an ID, information about its operating system, information about its video driver(s), information about its video controller, its VGA capabilities, etc. A display configuration may include display-related information/settings such as the resolutions, scale ratios, and screen sizes of the internal display device of client computing device 100 and an external display device 110, among possibly other display-related information/settings such as refresh rate.

Settings prediction table 200 associates recommend settings with each display configuration. For example, the first row in settings prediction table 200 represents a scenario where client computing device 100 is connected to an external display device having a higher/equal resolution, higher/equal scale ratio, and larger/equal screen size as the internal display device. It is assumed that predictor 122 has predicted that, in such a scenario, the resolution of the external display device 110 should remain unchanged but its scale ratio should be set be 25% more than the scale ratio of the internal display device.

Settings prediction table 200 is intended as only one example of how predictor 122 could dynamically determine settings for an external display 110 based on a display configuration (e.g., based on current settings/characteristics of the internal and external display devices). Any other data structure(s) could be maintained and employed for this purpose. Notably, settings prediction table 200 enables different recommended settings to be determined based on the display configuration in which client computing device 100 may currently be used. For example, one entry in settings prediction table 200 could represent a scenario where the user is using client computing device 100 at home, another entry could represent a scenario where the user is using client computing device 100 at work, and another entry could represent a scenario where the user is using client computing device 100 to connect to a server.

Figure 3:
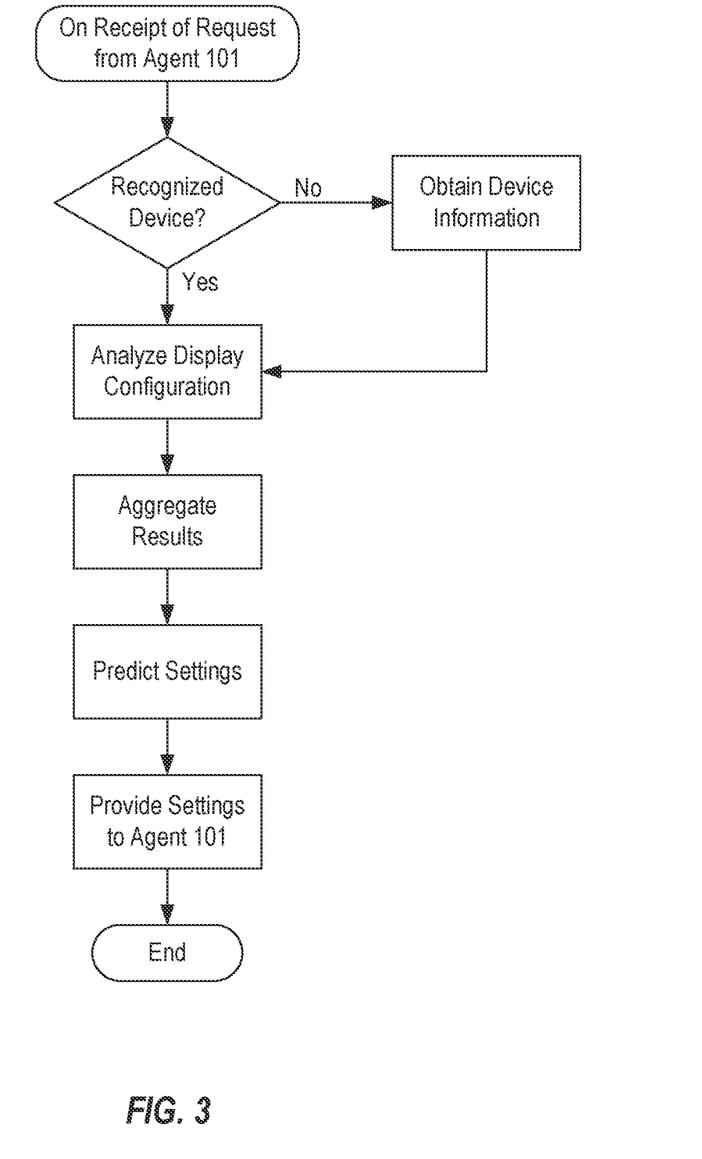
FIG. 3 is a flowchart representing functionality that can be performed by an adaptive display engine to dynamically determine settings for an external display device in accordance with embodiments of the present invention.

FIG. 3 is a flowchart representing functionality that adaptive display engine 120 may perform in some embodiments upon receiving a request from agent 101 for recommended settings. Such a request may include information identifying the client computing device 100 on which agent 101 is executing and may also specify the display configuration for the internal display device and one or more external displays 110 to which client computing device 100 is connected. Request handler 121 could initially evaluate such information identifying client computing device 100 to determine whether client computing device 100 has previously leveraged adaptive display engine 120 to obtain recommended settings for a display configuration. For example, request handler 121 could query database 123 to determine if entries exist for one or more device identifiers contained in the request. If not, request handler 121 could instruct agent 101 to gather such information for creating/updating entries in settings prediction table 200. For example, agent 101 could determine and provide device information for client computing device 100. Agent 101 could also provide information for identifying each external display device 110 to thereby enable adaptive display engine 120 to store recommended settings for a particular external display device 110.

In addition to identifying client computing device 100 and possibly each external display device 110 to which client computing device 100 is connected, agent 101 may also provide the display configuration (e.g., the resolutions, scale ratios, and screen sizes for the internal display device and each external display device 110). Once the display configuration is known (e.g., once the screen sizes are known and the current resolutions and scale ratios are known), predictor 122 can analyze the display configuration to determine which settings are the closest match. For example, predictor 122 could analyze the display configuration against each relevant entry in settings prediction table 200 and aggregate the results of such analysis. From the aggregated results, predictor 122 could then determine which entry in settings prediction table 200 most closely matches the display configuration and could select the settings associated with the matching entry as the recommended settings to apply to the corresponding external display device 110.

As mentioned above, settings prediction table 200 is intended to be a simple representation of one technique by which predictor 122 may dynamically determine settings for an external display device 110. In other embodiments, settings prediction table 200 may have many entries with highly granular setting variations to thereby enable predictor 122 to provide highly customized settings (e.g., by identifying specific resolutions, scale ratios, and/or screen sizes and corresponding recommended settings).

Upon determining/predicting the recommended settings for the current display configuration, predictor 122 can provide the recommended settings to agent 101 via request handler 121. Agent 101 may then automatically apply the recommended settings on client computing device 100. In this way, dynamically determined settings can be automatically applied on client computing device 100 to customize a display configuration for a particular user and/or use case.

Notably, by implementing embodiments of the present invention, the settings that are automatically applied to an external display device can be dynamically determined based on the current settings and characteristics of an internal display device relative to the current settings and characteristics of the external display device. For example, a user may manually select a preferred scale ratio for a laptop's internal display device. Based on this preferred scale ratio, adaptive display engine 120 could predict settings for any external display device 110 to which the user may subsequently connect client computing device 100 and such predicted settings can provide a consistent appearance of windows, text, icons, etc. across the display devices without requiring subsequent user input.

Figure 4A:
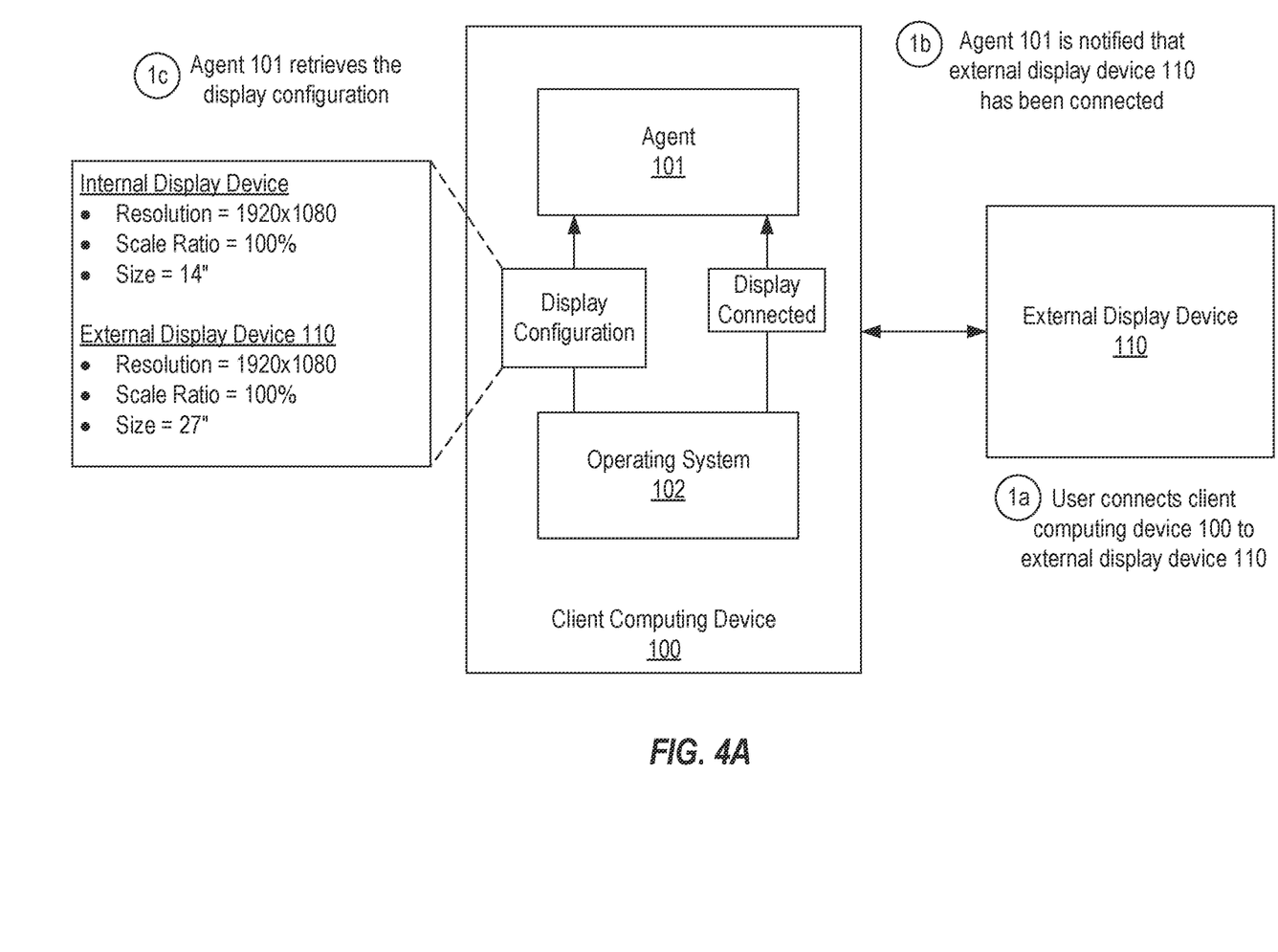
FIGS. 4A-4F provide an example of how an agent on a client computing device can interface with an adaptive display engine to obtain recommended settings for an external display device that is connected to the client computing device.

FIGS. 4A-4F provide an example of how agent 101 and adaptive display engine 120 may interact to dynamically configure an external display device 110 when it is connected to client computing device 100. Turning to FIG. 4A, in step 1a, it is assumed that the user connects client computing device 100 to external display device 110. For example, the user may connect client computing device 100 to a dock to which external display device 110 is connected, may connect client computing device 100 directly to external display device 110, or, although not shown, could employ client computing device 100 to view a server's desktop on external display device 110. Although this example involves a single external display device 110, the depicted functionality could be performed for each external display device 110 to which client computing device 100 may be connected.

In step 1b, agent 101 is notified that external display device 110 has been connected. For example, agent 101 could have registered with operating system 102 to be notified when external display devices 110 are connected. This notification could identify external display device 110 in any suitable manner. In step 1c, and in response to the notification, agent 101 may interface with operating system 102 or any other suitable component to retrieve the current display configuration for its internal display device (e.g., its built-in screen) and for external display device 110. In this example, it is assumed that client computing device 100 is a laptop having an internal display device with a 14-inch screen, a resolution of 1920×1080, and a scale ratio that is currently set to 100%. It is also assumed that external display device 110 has a 27-inch screen, a resolution of 1920×1080, and a scale ratio that is currently set to 100%. Agent 101 could obtain this display configuration in any suitable manner such as via the Win32_VideoController WMI class on a Windows-based system or the xrandr utility on a Linux-based system.

Figure 4B:
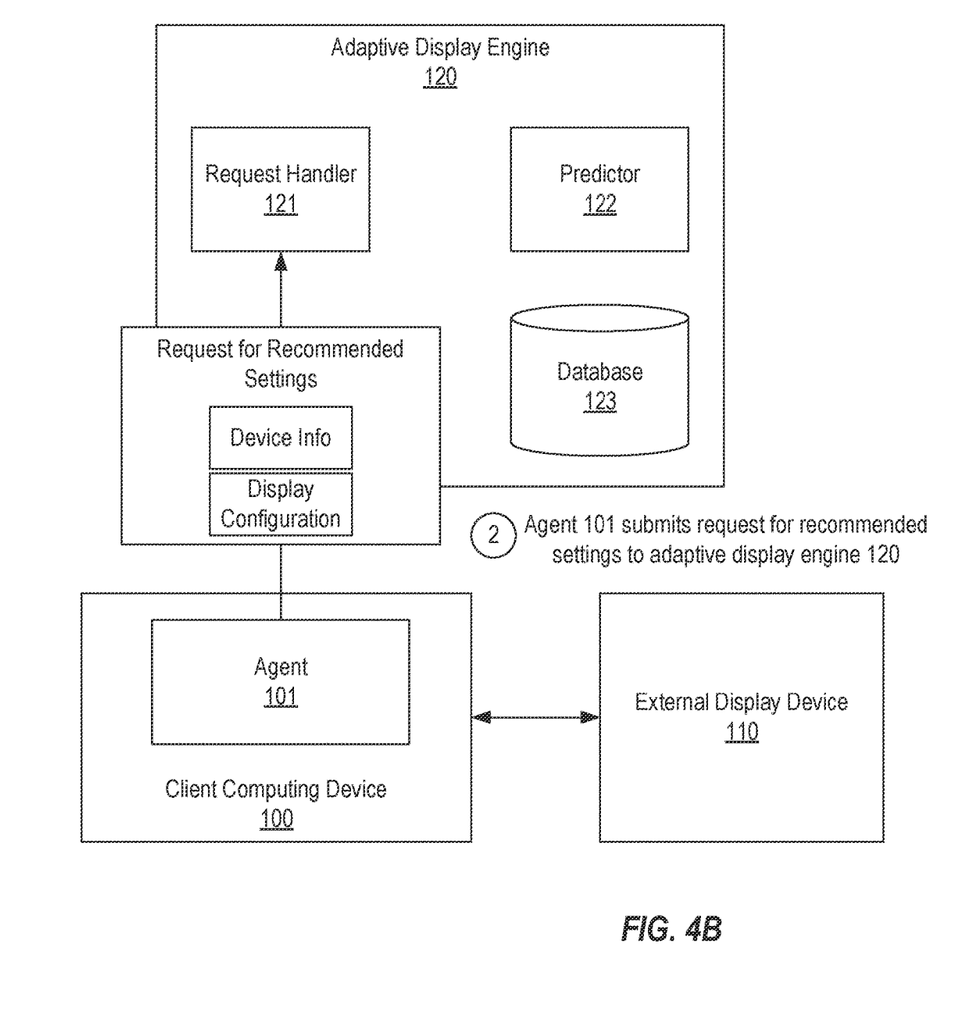

Turning to FIG. 4B, in step 2 and after obtaining the display configuration, agent 101 can submit a request for recommended settings to request handler 121. This request for recommended settings can include the display configuration for the internal display device and for external display device 110 along with device information about both display devices (e.g., identifiers of the display devices and possibly other characteristics).

Figure 4C:
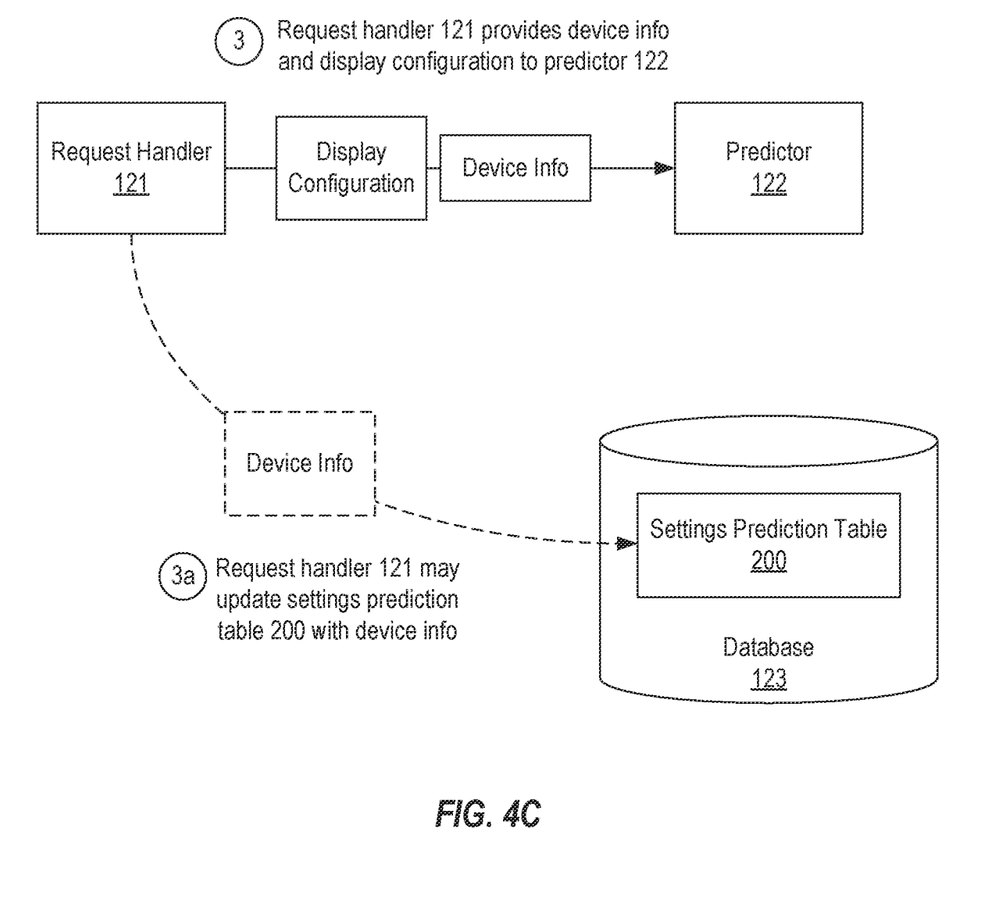

Turning to FIG. 4C, in step 3, request handler 121 can provide the display configuration and device information (e.g., identifiers of the display devices) to predictor 122 to allow predictor 122 to dynamically determine settings for external display device 110 based on the display configuration. In an optional step 3a, request handler 121 could add/update device information in settings prediction table 200. For example, if device information for client computing device 100, the internal display device, and/or external display device 110 had not previously been obtained, such device information could be added to appropriate entries in settings prediction table 200.

Figure 4D:
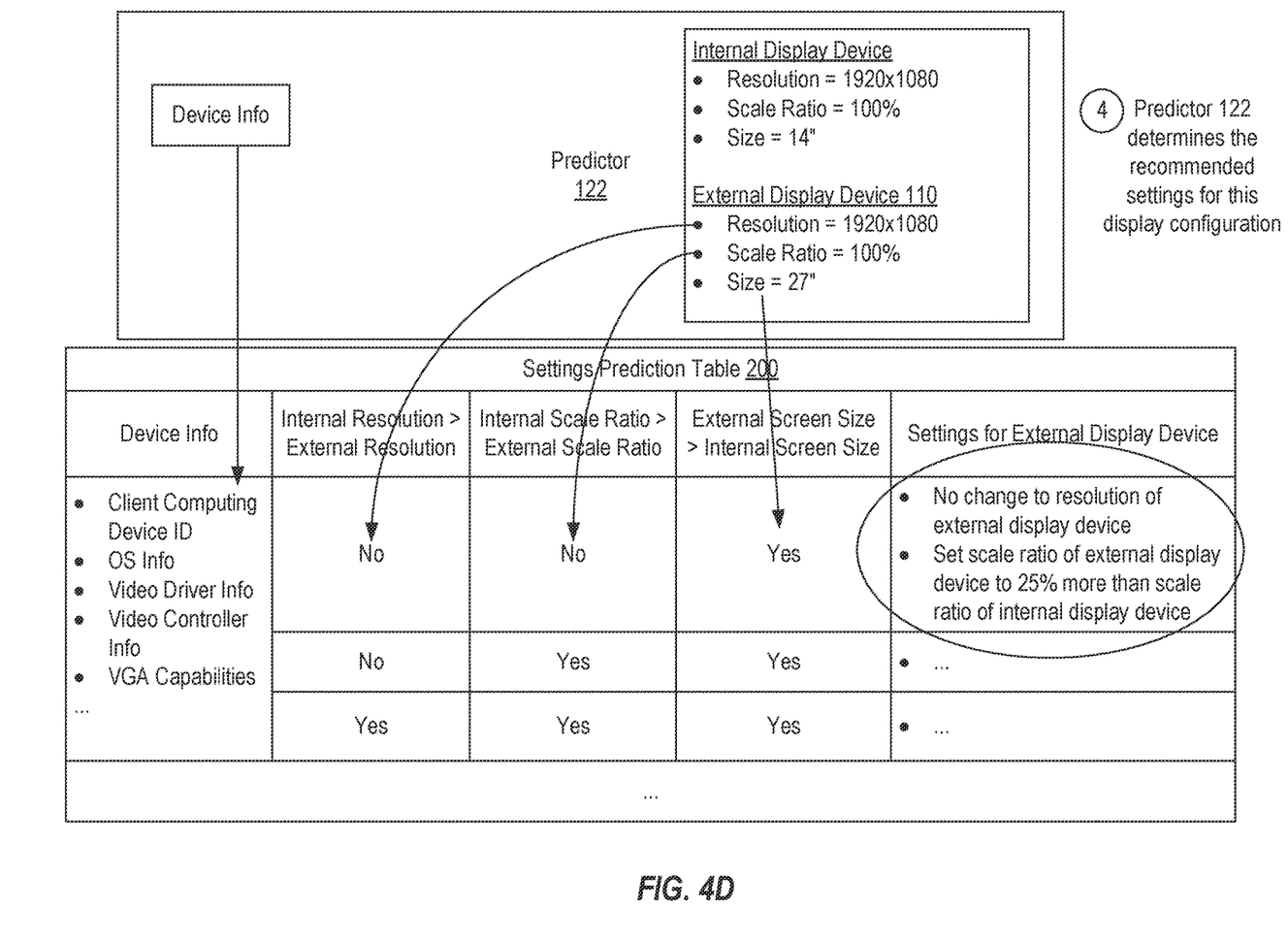

Turning to FIG. 4D, in step 4, predictor 122 can determine recommended settings based on the received display configuration, or in other words, based on the current settings and characteristics of the internal display device and external display device 110. For example, predictor 122 may use the provided device information to identify a corresponding set of entries in settings prediction table 200 and may use the provided display configuration to identify a most closely matching entry in this set. In the depicted example, based on the relative resolutions, scale ratios, and screen sizes of the internal display device and external display device 110, predictor 122 may determine that the settings associated with the first entry should be dynamically applied to external display device 110. These settings indicate that the resolution of external display device 110 should remain unchanged but the scale ratio of external display device 110 should be set to be 25% more than the scale ratio of the internal display device.

Figure 4E:
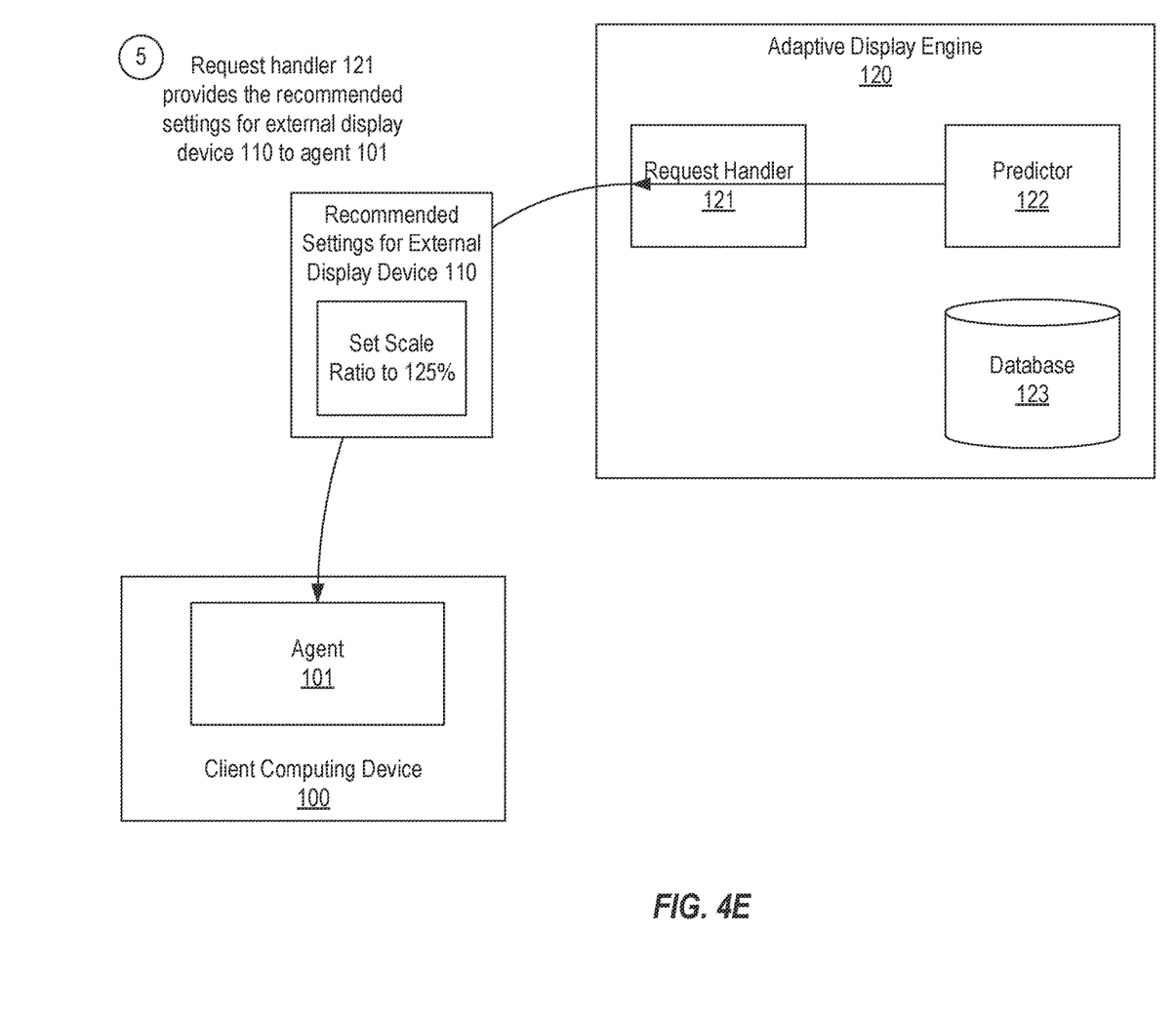

Turning to FIG. 4E, in step 5, predictor 122 can send to agent 101, via request handler 121, the recommended settings for external display device 110. As shown, the recommended settings in this example can include setting the scale ratio to 125% which is 25% more than the 100% scale ratio to which the internal display device is currently set.

Figure 4F:
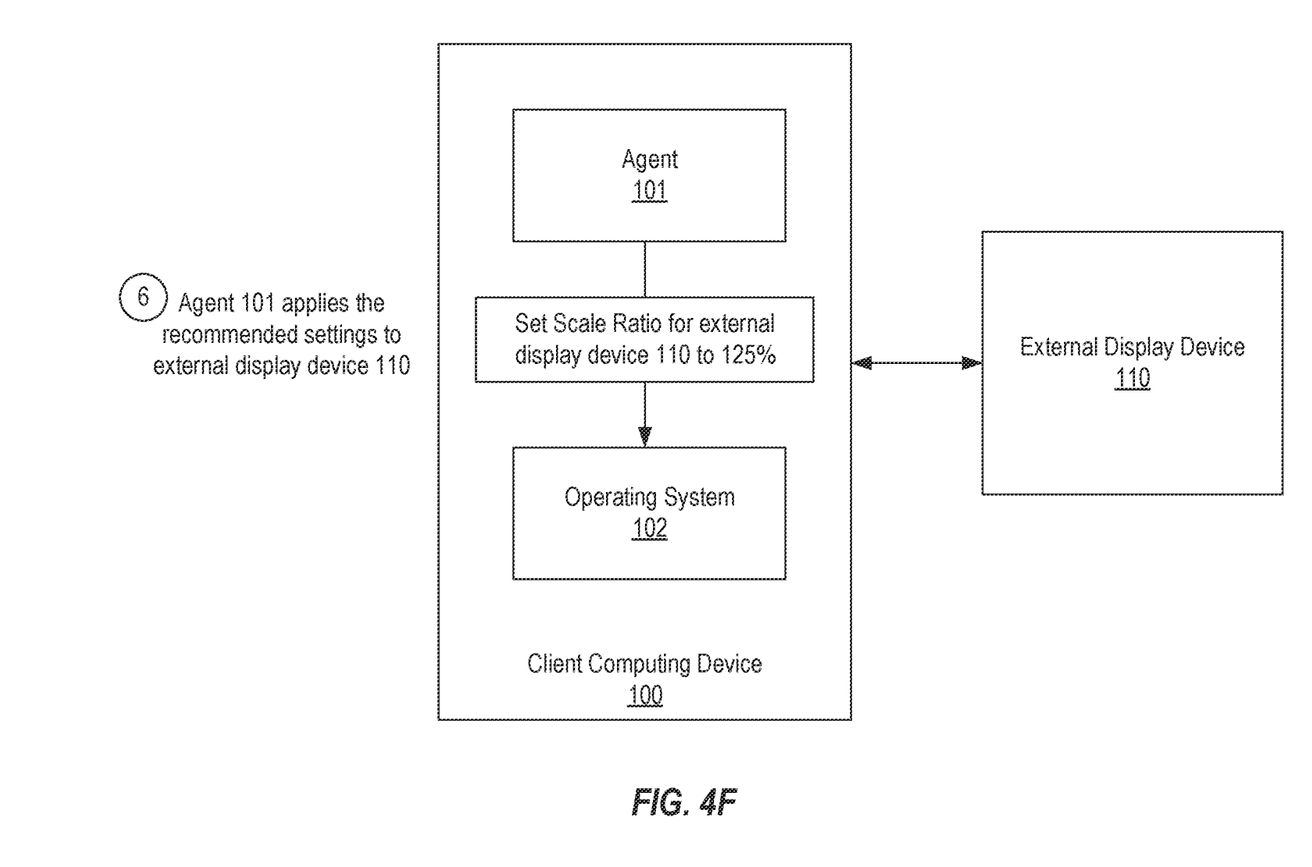

Turning to FIG. 4F, in step 6, and in response to receiving the recommended settings, agent 101 can apply the recommended settings. For example, agent 101 can interface with operating system 102 to set the scale ratio of external display device 110 to 125%. In this way, agent 101 can cause external display device 110 to be configured in a manner that is most likely to match a user's preferences.

In some embodiments, agent 101 may also be configured to detect when the user manually adjusts the display configuration and can report such adjustments to adaptive display engine 120. For example, if after the process represented in FIGS. 4A-4F, the user manually adjusted the display configuration while client computing device 100 is connected to external display device 110 (e.g., by changing the resolution and/or the scale ratio of the internal display device and/or external display device 110), agent 101 could detect and report such changes. Upon receiving such changes, predictor 122 could update settings prediction table 200 if appropriate to cause more accurate settings to be predicted when client computing device 100 is connected to external display device 110. For example, predictor 122 could adjust the settings associated with an entry in settings prediction table 200 or could create a new entry in settings prediction table 200.

As another example, when embodiments of the present invention are implemented, adaptive display engine 120 could learn that the user prefers having the scale ratio of large external display devices set to a lower value than may be the default (e.g., by detecting that the user (or admin) manually changes the scale ratio from 300% to 150% when a large display device is connected). Adaptive display engine 120 could then cause agent 101 to automatically set the scale ratio to a preferred value (e.g., a value relative to the current scale value of the internal display device) whenever the user connects to any large external display device even if the user has not previously connected to the particular external display device. Likewise, adaptive display engine 120 could rely on the device information to predict a similar preferred scale ratio when other similar users connect to large display devices (e.g., users having the same type of laptop with the same display architecture). Such predictions could also be based on user characteristics (e.g., users belonging to a particular department at a company, users that have similar habits (e.g., as detected by agent), users that use the same external display devices, etc.).

Again, settings prediction table 200 is only a simple example of how predictor 122 could define recommended settings and more complex techniques could be used. For example, predictor 122 could employ machine learning to predict settings for a particular display configuration based on many users' use of client computing devices 100 with many external display devices 110. In some embodiments, recommended settings could be predicted based on the display configuration in addition to various combinations of device information and/or user information. For example, different recommended settings could be predicted when client computing devices 100 run different operating systems, have different video drivers, have different video controller architectures, etc. Accordingly, settings prediction table 200 should be viewed as representing the ability to predict settings for a display device based on any combination of any of the depicted information and other information.

In summary, embodiments of the present invention can be implemented to automatically configure display devices to best match a user's preferences even when the user has not previously connected to the display devices. Embodiments of the present invention can therefore benefit all users including those that may not otherwise be capable of adjusting display configurations manually and those that may find such adjustments burdensome and tedious.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for configuring an external display device comprising:
   receiving, at an adaptive display engine, a request for recommended settings for an external display device that has been connected to a client computing device, the request identifying a display configuration, the display configuration including one or more current settings or characteristics of the external display device and one or more current settings or characteristics of an internal display device of the client computing device, the request also including device information for the client computing device;
   providing the display configuration to a predictor of the adaptive display engine;
   using, by the predictor, the device information to locate a plurality of entries in a settings prediction data structure that are associated with the device information, each of the plurality of entries defining a different set of relationships between one or more possible settings or characteristics of the external display device and one or more possible settings or characteristics of the internal display device;
   determining that a set of relationships between the one or more current settings or characteristics of the external display device and the one or more current settings or characteristics of the internal display device matches the set of relationships defined in a first entry of the plurality of entries;
   in response to the determination, selecting settings defined in the first entry as recommended settings for the external display device; and
   providing the recommend settings to the client computing device to thereby enable the client computing device to automatically apply the recommended settings to configure the external display device.

2. The method of claim 1, wherein the adaptive display engine is hosted in a cloud.

3. The method of claim 1, wherein the one or more current settings or characteristics of the internal display device comprise one or more of: a resolution, a scale ratio, or a screen size.

4. The method of claim 1, wherein the one or more current settings or characteristics of the internal display device comprise each of: a resolution, a scale ratio, and a screen size.

5. The method of claim 1, wherein the one or more current settings or characteristics of the external display device comprise one or more of: a resolution, a scale ratio, or a screen size.

6. The method of claim 1, wherein the one or more current settings or characteristics of the external display device comprise each of: a resolution, a scale ratio, and a screen size.

7. The method of claim 1, wherein the display configuration includes a resolution, a scale ratio, and a screen size of the internal display device of the client computing device and a resolution, a scale ratio, and a screen size of the external display device.

8. The method of claim 1, wherein the recommended settings include one or more of: a resolution, a scale ratio, or a refresh rate for the external display device.

9. The method of claim 1, wherein the recommended settings include a scale ratio for the external display device that is based on a current scale ratio of the internal display device of the client computing device.

10. The method of claim 1, wherein the plurality of entries are defined using machine learning.

11. One or more computer storage media storing computer executable instructions which when executed by one or more processors implement a method for configuring an external display device comprising:
    detecting, by an agent executing on a client computing device, that an external display has been connected to the client computing device;
    obtaining, by the agent, a display configuration in response to detecting that the external display device has been connected to the client computing device, the display configuration including one or more current settings or characteristics of the external display device and one or more current settings or characteristics of an internal display device of the client computing device;
    sending, by the agent and to an adaptive display engine, a request for recommended settings for the external display device, the request including the display configuration and device information for the client computing device;
    providing the display configuration to a predictor of the adaptive display engine;
    using, by the predictor, the device information to locate a plurality of entries in a settings prediction data structure that are associated with the device information, each of the plurality of entries defining a different set of relationships between one or more possible settings or characteristics of the external display device and one or more possible settings or characteristics of the internal display device;
    determining that a set of relationships between the one or more current settings or characteristics of the external display device and the one or more current settings or characteristics of the internal display device matches the set of relationships defined in a first entry of the plurality of entries;
    in response to the determination, selecting settings defined in the first entry as recommended settings for the external display device; and
    receiving, by the agent and from the adaptive display engine, the recommended settings for the external display device; and
    applying, by the agent, the recommended settings to configure the external display device.

12. The computer storage media of claim 11, wherein the recommended settings include one or more of: a resolution, a scale ratio, or a refresh rate for the external display device.

13. A system comprising:
    an adaptive display engine; and
    a plurality of client computing devices, each of the plurality of client computing devices including an agent;
    wherein the adaptive display engine and each agent are configured to implement a method for dynamically configuring external display devices that are connected to the plurality of client computing devices, the method comprising:

detecting, by the agent, that an external display has been connected to the respective client computing device;

obtaining, by the agent, a display configuration in response to detecting that the external display device has been connected to the respective client computing device, the display configuration including one or more current settings or characteristics of the external display device and one or more current settings or characteristics of an internal display device of the client computing device;

sending, by the agent and to the adaptive display engine, a request for recommended settings for the external display device, the request including the display configuration device information for the client computing device;

providing the display configuration to a predictor of the adaptive display engine;

using, by the predictor, the device information to locate a plurality of entries in a settings prediction data structure that are associated with the device information, each of the plurality of entries defining a different set of relationships between one or more possible settings or characteristics of the external display device and one or more possible settings or characteristics of the internal display device;

determining that a set of relationships between the one or more current settings or characteristics of the external display device and the one or more current settings or characteristics of the internal display device matches the set of relationships defined in a first entry of the plurality of entries;

in response to the determination, selecting settings defined in the first entry as recommended settings for the external display device; and receiving, by the agent and from the adaptive display engine, the recommended settings for the external display device; and applying, by the agent, the recommended settings to configure the external display device.

14. The system of claim 13, wherein the recommended settings include a scale ratio for the external display device.

15. The system of claim 13, wherein the adaptive display engine is hosted in the cloud.

16. The system of claim 13, wherein the one or more current settings or characteristics of the internal display device comprise one or more of: a resolution, a scale ratio, or a screen size.

17. The system of claim 13, wherein the one or more current settings or characteristics of the internal display device comprise each of: a resolution, a scale ratio, and a screen size.

18. The system of claim 13, wherein the recommended settings include a scale ratio for the external display device that is based on a current scale ratio of the internal display device of the client computing device.

19. The system of claim 13, wherein the recommended settings for the external display device are defined using machine learning.

20. The system of claim 13, wherein the recommended settings include: a resolution, a scale ratio, and a refresh rate for the external display device.

* * * * *